United States Patent
Libin

(10) Patent No.: US 11,632,258 B1
(45) Date of Patent: Apr. 18, 2023

(54) RECOGNIZING AND MITIGATING DISPLAYS OF UNACCEPTABLE AND UNHEALTHY BEHAVIOR BY PARTICIPANTS OF ONLINE VIDEO MEETINGS

(71) Applicant: All Turtles Corporation, Little Rock, AR (US)

(72) Inventor: Phil Libin, San Francisco, CA (US)

(73) Assignee: All Turtles Corporation, Little Rock, AR (US)

( * ) Notice: Subject to any disclaimer, the term of this patent is extended or adjusted under 35 U.S.C. 154(b) by 38 days.

(21) Appl. No.: 17/226,315

(22) Filed: Apr. 9, 2021

Related U.S. Application Data

(60) Provisional application No. 63/008,769, filed on Apr. 12, 2020.

(51) Int. Cl.

| | |
|---|---|
| *H04L 12/18* | (2006.01) |
| *G06N 20/00* | (2019.01) |
| *G06V 20/40* | (2022.01) |
| *G06F 1/16* | (2006.01) |
| *G06F 3/16* | (2006.01) |
| *G06K 9/62* | (2022.01) |
| *G08B 3/10* | (2006.01) |
| *G06V 40/20* | (2022.01) |
| *G06V 40/10* | (2022.01) |

(Continued)

(52) U.S. Cl.
CPC .......... *H04L 12/1831* (2013.01); *G06F 1/163* (2013.01); *G06F 3/165* (2013.01); *G06F 18/214* (2023.01); *G06N 20/00* (2019.01); *G06V 20/46* (2022.01); *G06V 40/107* (2022.01); *G06V 40/172* (2022.01); *G06V 40/28* (2022.01); *G08B 3/10* (2013.01)

(58) Field of Classification Search
CPC .... H04L 12/1831; G06N 20/00; G06V 20/46; G06V 40/28; G06V 40/107; G06F 1/163; G06F 3/165; G06K 9/6256
See application file for complete search history.

(56) References Cited

U.S. PATENT DOCUMENTS

| | | | |
|---|---|---|---|
| 7,046,779 B2 * | 5/2006 | Hesse | H04N 7/152 379/202.01 |
| 9,714,037 B2 * | 7/2017 | DeRuyck | G06V 20/597 |

(Continued)

*Primary Examiner* — Tauqir Hussain
(74) *Attorney, Agent, or Firm* — Muirhead and Saturnelli, LLC

(57) ABSTRACT

Handling unacceptable behavior by a participant in a video conference includes detecting the unacceptable behavior by the participant by applying machine learning to data about the participant received from one or more capturing devices and by using a predetermined list of bad habits, determining recognition accuracy for the unacceptable behavior, and providing a response to the unacceptable behavior that varies according to the recognition accuracy. The machine learning may include an initial training phase that, prior to deployment, is used to obtain a general recognition capability for each item on the predetermined list of bad habits. The one or more capturing devices may include a laptop with a camera and a microphone, a mobile device, autonomous cameras, add-on cameras, headsets, regular speakers, smart watches, wristbands, smart rings, and wearable sensors, smart eyewear, heads-up displays, headbands, and/or smart footwear.

23 Claims, 12 Drawing Sheets

(51) Int. Cl.
*G06V 40/16* (2022.01)
*G06F 18/214* (2023.01)

(56) References Cited

U.S. PATENT DOCUMENTS

| | | | | |
|---|---|---|---|---|
| 10,795,183 | B1* | 10/2020 | Lewis | A61F 9/045 |
| 11,418,757 | B1* | 8/2022 | Parampottil | H04N 7/147 |
| 2008/0068447 | A1* | 3/2008 | Matti | H04N 7/15 |
| | | | | 348/E7.083 |
| 2009/0079816 | A1* | 3/2009 | Qvarfordt | G06V 40/20 |
| | | | | 348/14.16 |
| 2016/0046298 | A1* | 2/2016 | DeRuyck | G06V 20/597 |
| | | | | 340/576 |
| 2016/0234268 | A1* | 8/2016 | Ouyang | H04L 67/54 |
| 2016/0330084 | A1* | 11/2016 | Hunter | H04L 47/2425 |
| 2017/0330042 | A1* | 11/2017 | Vaziri | H04N 5/332 |
| 2018/0123629 | A1* | 5/2018 | Wetzig | G08B 21/0423 |
| 2018/0307320 | A1* | 10/2018 | Ananthapur Bache | |
| | | | | G06F 3/04845 |
| 2020/0159487 | A1* | 5/2020 | Dawson | G06F 3/16 |
| 2020/0245900 | A1* | 8/2020 | Douglas | A61B 5/150809 |
| 2021/0035399 | A1* | 2/2021 | Dai | G06K 7/1417 |
| 2021/0056968 | A1* | 2/2021 | Shreeshreemal | G10L 15/22 |
| 2021/0295728 | A1* | 9/2021 | Sarrafzadeh | G10L 15/083 |
| 2022/0116736 | A1* | 4/2022 | Williams | G06Q 20/3224 |
| 2022/0203996 | A1* | 6/2022 | Katz | G06V 10/82 |
| 2022/0253126 | A1* | 8/2022 | Holland | G06F 3/011 |
| 2022/0280098 | A1* | 9/2022 | Hao | A61B 5/4803 |
| 2022/0284530 | A1* | 9/2022 | Bucciarelli | H04W 4/00 |

* cited by examiner

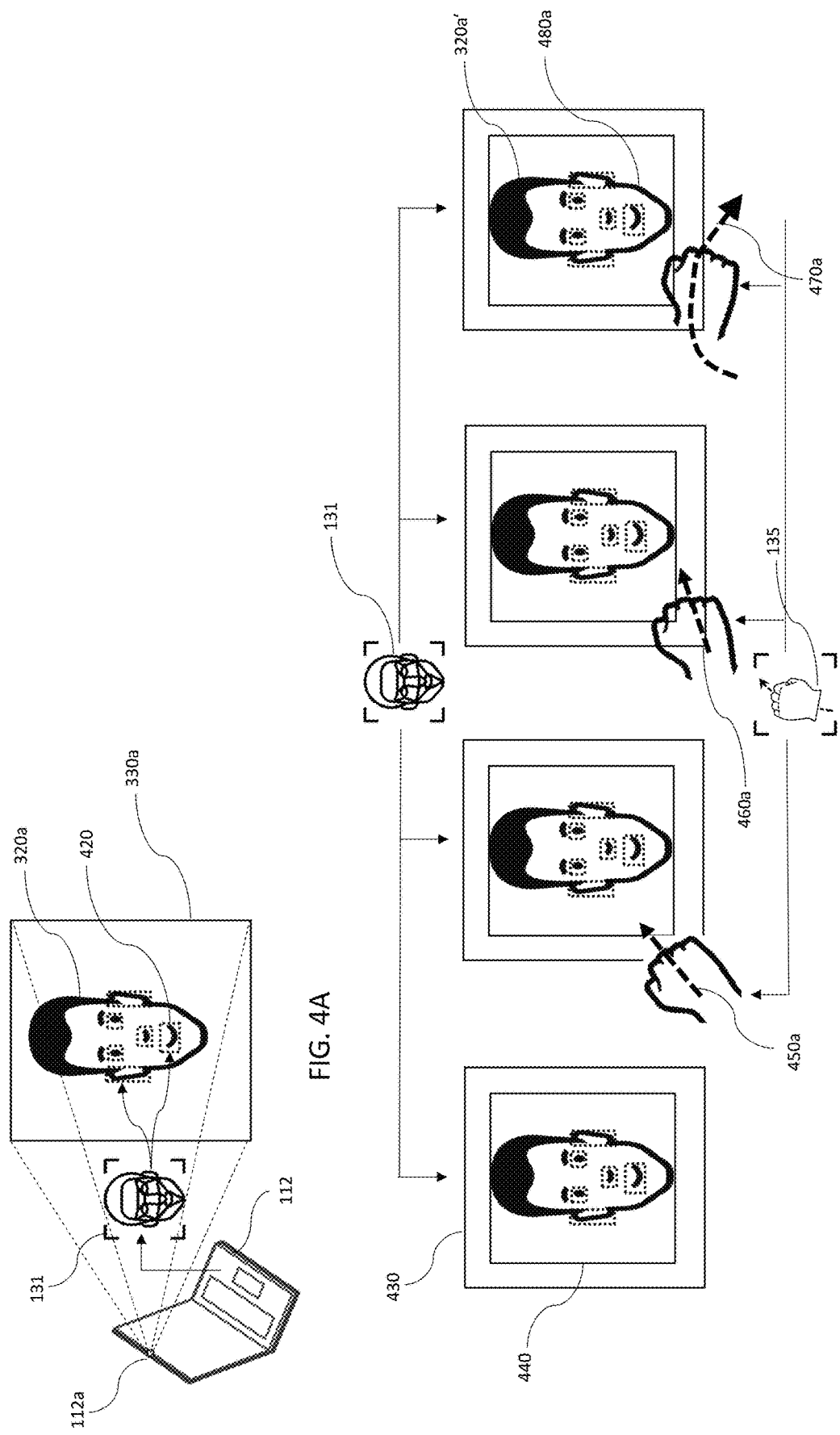

RECOGNIZING AND MITIGATING DISPLAYS OF UNACCEPTABLE AND UNHEALTHY BEHAVIOR BY PARTICIPANTS OF ONLINE VIDEO MEETINGS

CROSS-REFERENCE TO RELATED APPLICATIONS

This application claims priority to U.S. Prov. App. No. 63/008,769, filed on Apr. 12, 2020, and entitled "TRACKING HAND MOVEMENTS AND GENERATING ALARMS TO PREVENT USERS FROM TOUCHING THEIR FACES", which is incorporated herein by reference.

TECHNICAL FIELD

This application is directed to the field of facial, gesture, hand movement and gaze recognition, and more particularly to the field of recognizing and mitigating displays of unacceptable and unhealthy behavioral habits by participants of online video meetings.

BACKGROUND OF THE INVENTION

Video conferencing has grown into a pervasive communication method. Increasing globalization and mobilization of workforce emphasizes distributed product execution and continuous coordination between participating teams and individual contributors. Challenges presented by the COVID-19 pandemic requires billions of people to stay at home for prolonged periods of time and seriously limits, and may continue to limit, in-person communications. Efficient video communications between co-workers, business partners, friends and remote families are addressing these challenges and have become a key productivity, cultural and communications factor.

According to market research, the size of global video conferencing market has reached $3.85 billion USD in 2019 and was recently predicted to grow to $10.5 billion USD by 2027. Over half a billion users daily participate in video conferences just on three platforms: Zoom (300 million), Google Meet (over 100 million), and Microsoft Teams (also over 100 million). Recent polls have revealed important usage statistics for video conferencing: 94% of businesses who use video conferencing state that the company benefits from greater productivity; 75% of CEOs predict that video conferencing will replace regular conference calls; 54% of the US workforce frequently participates in video conferences; 78% of corporate businesses use video conferencing to facilitate team meetings; and 77.2% businesses use video conferencing to connect with remote employees. Equally positive poll and research results on user satisfaction with video conferencing have been published lately: 51% of workers value video conferencing either more or equally as important than business chat applications for their daily work; 93% of users agree that video conferencing improves the connectedness of remote team members; 90% believe that it improves the effectiveness of teams and 71% agree that video conferencing strengthens customer relationships.

Notwithstanding the growing proliferation, numerous benefits and sizable efficiency gains from video conferencing, research and media attention is increasingly attracted to a growing list of difficulties and challenges accompanying the broadening use of video conferencing solutions. An extensive list of technical and organizational problems with video meetings includes inadequate equipment, incompatible software applications (such as incompatible browsers blocking access to video meetings for some participants), corporate firewalls limiting user access, low network bandwidth and uneven latency for different participants, low audio quality, video and audio out of sync, insufficient scalability, difficulties starting video meetings, including the necessity of downloading and installing video conferencing software and upgrades, non-intuitive, slow and lagging screen sharing, lack of user experience, etc.

The long established inventory of technical and organizational challenges has been lately augmented with a growing list of socio-psychological, physiological and lifestyle problems faced by the video conferencing industry. Thus, the phenomenon of "Zoom fatigue" reported by nearly a quarter of frequent users of video conferencing services has invited an extensive research effort and has been explained from different and sometimes contradicting perceptional positions—for example, different studies in the area of tracking gaze direction have conflicting assessments of true vs. perceived and excessive vs. insufficient volume of eye contacts between meeting participants.

An important aspect of efficient video meeting environment is cultural and social acceptability of each participant's behavior by the rest of the participants. This concept touches multiple subjects, ranging from participant appearance, attire and condition of their home scene (in case it is preferred to a virtual background) to keeping positive attitude and body language and avoiding unacceptable behavioral displays and manifestations of bad habits, such as yawning, yelling at other participants, family members or pets, cursing, blowing or digging one's nose, turning away from the screen during presentation or discussion, etc. Such behavioral flaws may occur subconsciously and avoiding them, especially in a lengthy meeting, may be challenging. Some of the above habits may also be unhealthy or even harmful; for example, when meeting participants are touching their faces, there is a risk of spreading viruses and germs from participant's fingers to mucous membranes and of further infections with dangerous viruses, such as Covid-19, flu, etc.

In spite of extensive case studies and media reports and notwithstanding the availability of hardware and software capabilities for capturing and tracking participant behavior and for meeting control (for example, facial and gesture recognition technologies are built into all major software platforms and eye-tracking is supported by a growing list of mobile devices), there is little practical research and assistance in detecting and mitigating unacceptable, disagreeable and/or unhealthy behavior of video meeting participants.

Accordingly, it is desirable to recognize and mitigate unacceptable behavior by participants of video conferences and to recognize and mitigate unhealthy behavior by individuals.

SUMMARY OF THE INVENTION

According to the system described herein, handling unacceptable behavior by a participant in a video conference includes detecting the unacceptable behavior by the participant by applying machine learning to data about the participant received from one or more capturing devices and by using a predetermined list of bad habits, determining recognition accuracy for the unacceptable behavior, and providing a response to the unacceptable behavior that varies according to the recognition accuracy. The machine learning may include an initial training phase that, prior to deployment, is used to obtain a general recognition capability for each item on the predetermined list of bad habits. The one or more capturing devices may include a laptop with a camera and a microphone, a mobile device, autonomous cameras, add-on cameras, headsets, regular speakers, smart watches, wristbands, smart rings, and wearable sensors, smart eyewear, heads-up displays, headbands, and/or smart footwear. The data about the participant may include visual data, sound data, motion, proximity and/or chemical sensor data, heart rate, breathing rate, and/or blood pressure. The list of bad habits may include nail biting, yelling, making unacceptable gestures, digging one's nose, yawning, blowing one's nose, combing one's hair, slouching, and/or looking away from a screen being used for the video conference. Technologies used to detect bad habits may include facial recognition, sound recognition, gesture recognition, and/or hand movement recognition. Yawning may be detected using a combination of the facial recognition technology, the sound recognition technology, and the gesture recognition technology. Face touching may be detected using the facial recognition technology and hand movement recognition technology. Digging one's nose may be detected using the facial recognition technology and hand movement recognition technology. The recognition accuracy may be estimated to be lower at an early stage of the system than at later stages of the system and the response to the unacceptable behavior may be an alert to the user for each detected episode in response to the recognition accuracy being estimated to be lower. The participant may be asked to provide confirmation for each detected episode. The confirmation provided by the participant may be used to improve the recognition accuracy of the machine learning. The confirmation provided by the participant may be used to improve recognition speed of the machine learning. The confirmation provided by the participant may be used to provide early recognition of displays of the bad habits detected by the machine learning. Early recognition may be used to predict when a participant will exhibit unacceptable behavior. The response may be provided when the participant is predicted to exhibit unacceptable behavior. The response may include cutting off audio input of the user and/or cutting off video input of the user. The early recognition may be based on observed behavioral norms of the participant and/or planned activities of the participant. The participant may be provided with only a warning if the participant is not providing audio input and/or video input to the video conference.

According further to the system described herein, a non-transitory computer readable medium includes software that handles unacceptable behavior by a participant in a video conference. The software includes executable code that detects the unacceptable behavior by the participant by applying machine learning to data about the participant received from one or more capturing devices and by using a predetermined list of bad habits, executable code that determines recognition accuracy for the unacceptable behavior, and executable code that executable code that provides a response to the unacceptable behavior that varies according to the recognition accuracy.

According further to the system described herein, preventing a user from touching a face of the user includes obtaining video frames of the user including the face of the user, applying facial recognition technology to the video frames to detect locations of particular portions of the face, detecting a position, shape, and trajectory of a moving hand of the user in the video frames, predicting a final position and shape of the hand based on the position, shape, and trajectory of the hand and on the locations of the specific portions of the face, and providing an alarm to the user in response to predicting a final position of the hand will be touching the face of the user. The user may be a participant in a video conference. Predicting a final position of the hand may include determining if the hand crosses an alert zone that is proximal to the face. The alarm may vary according to a predicted final shape of the hand and according to predicting that a final position of the hand will be touching a specific one of the particular portions of the face. The predicted final shape of the hand may be an open palm or open fingers. A sound for the alarm provided in response to the predicted final shape being an open palm may be less severe than a sound for the alarm provided in response to the predicted final shape being open fingers and the predicted final position being a mouth, nose, eyes, or ears of the user. A sound for the alarm may become more severe as the predicted final position and the predicted final shape changes to the predicted final shape being open fingers and the predicted final position being a mouth, nose, eyes, or ears of the user.

According further to the system described herein, a non-transitory computer readable medium contains software that prevents a user from touching a face of the user. The software includes executable code that obtains video frames of the user including the face of the user, executable code that applies facial recognition technology to the video frames to detect locations of particular portions of the face, executable code that detects a position, shape, and trajectory of a moving hand of the user in the video frames, executable code that predicts a final position and shape of the hand based on the position, shape, and trajectory of the hand and on the locations of the specific portions of the face, and executable code that provides an alarm to the user in response to predicting a final position of the hand will be touching the face of the user.

According further to the system described herein, preventing a user from touching a face of the user includes detecting a position, shape, and trajectory of a moving hand of the user based on one or more sensors from a wearable device of the user, predicting a final position and shape of the hand based on the position, shape, and trajectory of the hand and on the locations of the specific portions of the face, and providing an alarm to the user in response to predicting a final position of the hand will be touching the face of the user. The wearable device may be a smart watch and at least one of the position, shape, and trajectory of the moving hand may be determined using sensors of the smart watch. Predicting the final position and shape of the hand may use machine learning that is adapted to the user during a training phase. The wearable device may be a smart ring and at least one of the position, shape, and trajectory of the moving hand may be determined using a proximity sensor, an accelerometer or a gyroscope of the smart ring. The wearable device may be smart glasses and at least one of the position, shape, and trajectory of the moving hand may be determined using a proximity sensor of the smart glasses.

According further to the system described herein, a non-transitory computer readable medium contains software that prevents a user from touching a face of the user. The software includes executable code that detects a position, shape, and trajectory of a moving hand of the user based on one or more sensors from a wearable device of the user, executable code that predicts a final position and shape of the hand based on the position, shape, and trajectory of the hand and on the locations of the specific portions of the face, and executable code that provides an alarm to the user in response to predicting a final position of the hand will be touching the face of the user.

The proposed system offers a mechanism for recognizing and mitigating displays of unacceptable behavior by video meeting participants and prevents individuals (collectively, users) from touching their faces by identifying a pool of capturing devices and techniques accessible by users and capable of continuous monitoring of users; assembling a recognition and tracking technology stack for detecting manifestations of unacceptable behaviors or attempts by users to touch their faces; continuously training recognition and tracking technologies to improve recognition speed and accuracy; warning and notifying users about manifestations and attempts of unacceptable and unhealthy behavior, offering users recommendations on avoiding such behavior and, where possible, automatically and temporarily restricting user visibility and/or audibility during video meetings.

System functioning is explained in more detail below as follows:

1. Identifying capturing devices. By far the most ubiquitous device capturing audio-video stream of each meeting participant is a user's notebook with a built-in video camera and a microphone, typically running a major operating system and a standalone or browser-based video conferencing software and possessing a wireless internet connection with a sufficient bandwidth. Many advanced users enjoy a more sophisticated or even a professional audio-video setup with multiple monitors, cameras, microphones, headsets, smart speakers, sound enhancing and lighting equipment, green screens, etc. Some users run video conferences from their smartphones and tablets or use smartphones, tablets, and/or other mobile devices for content presentations and processing special types of input; in addition to capturing audio-video stream, user devices may track user movement, hand movement, gaze direction, etc. Finally, wearable devices and sensors, such as smart watches, wristbands and headbands, smart eyeglasses, smart rings, wearable medical sensors (including chemical sensors), etc. are capable of capturing and monitoring user movement, vital signs (pulse rate, temperature, respiration rate, blood pressure) and other physiological parameters, controlled and processed directly by wearable devices, by connected mobile devices, such as smartphones, or by cloud services and used in assessing emotional and physical conditions of users.

2. Compiling list of bad habits. Unacceptable behavioral traits and acts may be conditionally categorized into verbal and non-verbal, static and dynamic acts, and further into facial expressions, gestural, postural, verbally or audibly offensive and combined types. Depending on various cultural, national, social and meeting specific factors, the register of unacceptable behavior may include the following acts: yelling, yawning, blowing one's nose, touching face with fingers (especially rubbing eyes, digging one's nose or putting fingers in the mouth), nail-biting, itching, turning away from screen (for example, to look at a smartphone), combing hair in public, grimacing, displaying indecent gestures, cursing aloud, displaying bad posture, etc. The list of unacceptable behaviors may be restrictive and may be augmented too; also, there are notable exceptions from the list depending on different factors, including the meeting type. Thus, loudly blowing one's nose, hardly acceptable in a weekly company meeting or a conference call with company customers or partners, may not be considered particularly offensive or unacceptable in a support conference call between a physician and her patients during a flu season. Accordingly, lists of bad habits may be customized for various meeting types or for an individual meeting.

3. Assembling recognition and tracking technology stack. The majority of recognition and other technologies necessary for detecting manifestations of bad habits are already present and available to developers on mobile and desktop computers at least for the key operating systems, such as MacOS, iOS, Windows and Android. The basic inventory of technologies may include facial, gesture, hand movement, speech, sound, posture, sentiment, and general image recognition, and eye-tracking for detection of gaze direction (gaze estimation). Depending on a user specific configuration of capturing devices (as explained elsewhere herein), recognition technologies may use different sets of features and parameters. For example, detecting an emotional state of a user may be based strictly on image-based facial recognition if the user is captured only on a notebook camera; alternatively, detecting an emotional state of a user may also use vital signs such as heart and breathing rate and changes in the blood pressure if the user is wearing a smart watch, a wristband or medical sensors. Analogously, user hand movement may be captured strictly through a meeting video stream, but recognition accuracy may be increased if the user wears a smart ring with a motion sensor on a finger of the moving hand.

In addition to standard features of recognition algorithms, for example, facial expressions from the predefined set available with the pre-installed or installed (third party) facial recognition technology, the system may combine several technologies to recognize and track acts of unacceptable behavior. For example, an act of yawning may require a combination of facial recognition technology, gesture recognition technology (a mouth covering gesture representative of a portion of users, especially when they are in public) and a sound recognition technology (a characteristic yawning sound).

Table 1 exemplifies combinations of technologies used for recognition and tracking of certain bad habit acts from the above list.

TABLE 1

Examples of combined technologies for recognizing bad habit displays

| Bad habit | Technology 1 | | Technology 2 | | Technology 3 | |
|---|---|---|---|---|---|---|
| | Name | Application | Name | Application | Name | Application |
| Yawning | Facial recognition | Opening mouth | Sound recognition | Yawning sound | Gesture recognition | Covering mouth |
| Touching face | Facial recognition | Adding hotspots | Hand movement | Estimating final | | |

TABLE 1-continued

Examples of combined technologies for recognizing bad habit displays

| Bad habit | Technology 1 | | Technology 2 | | Technology 3 | |
|---|---|---|---|---|---|---|
| | Name | Application | Name | Application | Name | Application |
| | | (nose, mouth, eyes) | recognition | finger position | | |
| Digging nose | Facial recognition | Adding nose hotspot | Hand movement recognition | Estimating final finger position | | |

4. Machine learning. The process of training recognition algorithms via machine learning (ML) to obtain and improve the performance of recognition algorithms for individual users may include several phases:
  (i) An initial ML phase uses supervised or unsupervised learning with a large training set collected from multiple users and optionally supplied with the truth info (in a supervised option) to obtain a general recognition capability for each item on the list of bad habits (see above on combinations of recognition technologies required for the reliable recognition)
  (ii) A next phase tests results of the previous phase for an individual user and assesses recognition accuracy prior to real-life deployment.
  (iii) At a next phase, if the recognition accuracy is insufficient, additional training material is collected for the user and an additional ML phase is conducted. Note that potential updates may also include new features extracted for a particular user and a combined classifier.
  (iv) At a next phase, collection of training material is continued during deployment and the system provides periodic retraining of recognition algorithms aimed at several improvements, such as (a) recognition accuracy; (b) recognition speed; and (c) early recognition of displays of bad habits.

Item (iv)(c) is aimed at developing the possibility of recognizing bad habit displays based on early signs of the bad habits, which may be applied to an automatic control of user visibility and audibility for meeting participants, as explained below. A goal of early recognition of bad habit displays may be set at a start of a training process at phase (i) but early recognition of bad habit displays is more likely to be achieved at the phase (iv) because of high feature variations in a general multi-user sample and relative stability of features in training samples captured from an individual user.

5. Analytics and predictive behaviors. Behavioral analytics for each meeting by an individual user, including episodes of unacceptable behavior, potentially with recorded data fragments from devices in the capturing pool, may be stored, reviewed by the user, augmented with additional user lifestyle and activity data and processed to identify routines and predictive violations of behavioral norms by the user, provide additional training materials based on user reviews and assessments of recognition results, etc. For example, if a user has a predisposition to repetitive unstoppable yawning by the end of a tiring meeting, then the system may use the meeting schedule to predict a potentially unacceptable behavior during a next back-to-back meeting and take measures after the first yawning episode during that meeting. Analogously, if the wearable sensors show a heightened body temperature and/or the system has detected intense sneezing during non-meeting intervals, it may become a predictor of unacceptable meeting behavior on the same day and may cause the system to make a mitigating recommendation to the user, as further explained below.

6. Mitigation of unacceptable behaviors. Once an adequate technology stack has proven an ability to accurately detect and track unacceptable user behavior during video meetings in combination with an available pool of capturing devices, the system may provide different ways of mitigation of such behavior via alarms, notifications, recommendations and direct control of user visibility and/or audibility during video conferences. Some of the scenarios for such mitigation may be as follows:
  (a) At an early stage of the system functioning when recognition accuracy for unacceptable behaviors may not have reached high levels, the system may warn the user about each recognized episode of unacceptable behavior, sounding or displaying an individual alarm, invisible and not audible to other meeting participants, and may supplement the alarm with a brief notification, displaying a type of the detected behavior and asking for a one-click confirmation that the behavior was detected correctly (if the user does not pay attention to a notification, the notification goes away with a short timeout and without a determination of the true/false recognition result). User responses may be used to improve recognition accuracy, including the addition of false positive results to training materials. Mitigation of unacceptable behaviors is left to the user who may take note of the system warnings and modify meeting behavior or change, temporarily or permanently, visibility and audibility settings of the user for the ongoing meeting.
  (b) At a later stage of system work when recognition accuracy has improved, the system may monitor the frequency and repetitiveness of episodes of unacceptable behavior and offer the user inline mitigation advice similar to the advice that has been given to the user at an earlier phase. The user may switch back to a more detailed episode-by-episode tracking of system performance but a default functioning mode at the later stage may assume trusting the system actions.
  (c) At an advanced stage of system implementation for tracking video meeting behavior of the user, the system may use, in addition to the inline mitigation advice of the previous step, early detection of unacceptable behavior displays and predictive mechanisms from the analytics and daily routine tracking system and may automatically disable user visibility and/or audibility in the anticipation of, or in case of repetitions, of the unacceptable behavior episodes. The user may return to the fully or partially visibly and audible mode at any time.

(d) Each of the above stages may offer recommendations and reviews following a video conference or a series of conferences. As explained above, the purpose and content of the recommendations may depend on the stage/phase.

7. Additional system applications. The proposed system may expand beyond detection and mitigation of individual unacceptable behaviors of meeting participants. The system may also improve other components of a meeting environment. Examples of improvements may include a general purpose image and/or video recognition technology that may be used to detect undesirable static or dynamic objects in a meeting environment of a user, such as laundry items, cleaning supplies or other home disorders left visible in the background in a rush to join a meeting; family members or pets entering the room in the middle of a video meeting, etc. Upon detection, the system may warn a user, obfuscate undesired objects in the background or temporarily (or permanently for the duration of the meeting) replace the real background with a virtual background. Similarly, audio recognition and noise cancellation systems may detect and mitigate home or outside noises interfering with a video meeting.

8. Preventing users from touching their faces. This feature may be available both in the video meeting environment and during a regular user work and personal life. The system tracks user hand movements and position relative to the user's face by employing facial and hand movement recognition (technology stack) on desktop and notebook devices with front-facing cameras, as well as various types of sensors, including proximity sensors and accelerometers on smartphones and wearable devices (capturing device pool). Dynamic risk estimates of face touching in a potentially harmful manner may lead to the generation of sound and visual alarms of variable intensity, warning the user about a risky situation.

There are several scenarios under which the feature may be functioning:

A. Desktops and notebooks equipped with front-facing cameras. For users of notebooks equipped with front-facing cameras remaining in the field of view of their cameras, two software components, facial recognition and hand movement recognition, work in sync to track user behavior.
   a. Facial recognition identifies a face of a user in video frames captured by the front-facing camera and recognizes hotspots, representing face areas that are most sensitive to touch in terms of infection risks, such as the nose, mouth, eyes, and ear—each hotspot may become an entry point for a dangerous virus or bacteria.
   b. Hand movement recognition identifies hand presence and movement within an alert zone in each frame.
   c. The system estimates hand direction and speed and forecasts hand trajectory and the moment of touching the face.
   d. Hand status (fist, open palm), palm orientation and finger direction if fingers are pointing toward the face are recognized.
   e. The system assesses the riskiness of a particular hand configuration, i.e., the position, orientation and direction of hand, palm and fingers.
      For example, a finger directed to the face when the hand is also moving toward the face represents a risky configuration, whereas a user moving a first toward the chin of the user may be deemed a less risky configuration.
   f. By combining a previous assessment of hand trajectory and distance from the face and hand configuration, the system may decide to warn a user, for example, via a sound alarm, a visual alarm or a combined alarm. The intensity (sound volume, brightness, blinking intensity, etc.) of the alarm may correspond to the risk degree and may increase or decrease as the hand comes closer to the face or moves away.
   g. If the system failed to prevent the user from touching the face, the system may continue to alarm the user at a maximum or close to maximum volume/intensity, depending on how much of an infection risk is assigned to the particular touch; the maximum volume may be associated with touching the face with a palm or a finger within one of a plurality of facial hotspots, explained elsewhere herein.

B. Mobile and wearable devices with proximity and motion sensors. In cases where a user has one or more wearable devices, there are many different scenarios in which relatively early detection of hand movement carrying a risk of a user touching his or her face may be possible. System functioning may depend on the type of device, available sensor assembly and whether a user moves an active hand with the wearable device or a passive hand without the device. Several scenarios are explained below.
   a. A wearable device, such as a smart watch or a smart wristband, has advanced motion sensors; a user moves an active hand. In this scenario, the system may record hand trajectory and identify closeness of the hand to the user's face. A supercharged accelerometer may be able to identify dynamics of hand status and finger movements, which facilitates adequate risk assessment. By collecting multiple trajectories at a training phase, recording touch/no touch outcomes and performing machine learning, the system may build a classifier, predicting an alarming situation, and apply the classifier at a subsequent usage phase to turn alarms on and off and control intensity of the alarms.
   b. A wearable device, such as smart glasses, earbuds, headset, headband, earrings, necklace or other similar smart device may be permanently located near the face of the user and is equipped with an RF, IR or other proximity sensor. Proximity sensors may report the distance of a user hand (or other object) to the sensor or an event of crossing a threshold, corresponding to the NEAR and FAR states of the object. The system may alarm the user when a hand crosses the threshold or based on a pattern of changing the distance between the hand and the sensor (including possibly the velocity calculations). In this scenario, both hands may be passive, and the user may not have a wearable device. When the user has both a wearable device with a proximity sensor close to his face and a wristband or smart watch with motion and/or position sensors and possibly with another proximity sensor, the accuracy of risk assessment and the percentage of false positives for an alarm may both be improved. Note that the system may also need to prevent possible interference between proximity sensors on two adjacent devices.
   c. A smart ring, such as an Oura or a Motiv ring or an Amazon Echo Loop, may also include an accelerometer, a gyroscope and a proximity sensor. The proximity of a ring-wearing finger to the face may have a better risk detection accuracy than a wearable on a wrist of the user. However, absent another wearable device, this scenario may not be able to prevent the user from touching his or her face with a passive hand.

It should be noted that in each of the mobile scenarios B.a.-B.c., the system software may run on a user's smartphone, communicating with sensors on wearable devices via Bluetooth, Wi-Fi or other wireless connection. The smartphone may also be used to sound or display alarms.

BRIEF DESCRIPTION OF THE DRAWINGS

Embodiments of the system described herein will now be explained in more detail in accordance with the figures of the drawings, which are briefly described as follows.

FIGS. 4A-4D are schematic illustrations of dynamic facial and hand movement recognition, of trajectory and risk assessment, and of user alarm options, according to an embodiment of the system described herein.

DETAILED DESCRIPTION OF VARIOUS EMBODIMENTS

The system described herein offers a variety of mechanisms for recognizing and mitigating episodes of unacceptable behavior by video meeting participants and for preventing users from touching their faces.

FIGS. 1A-1D are schematic illustrations of the system architecture and components.

Figure 1A:
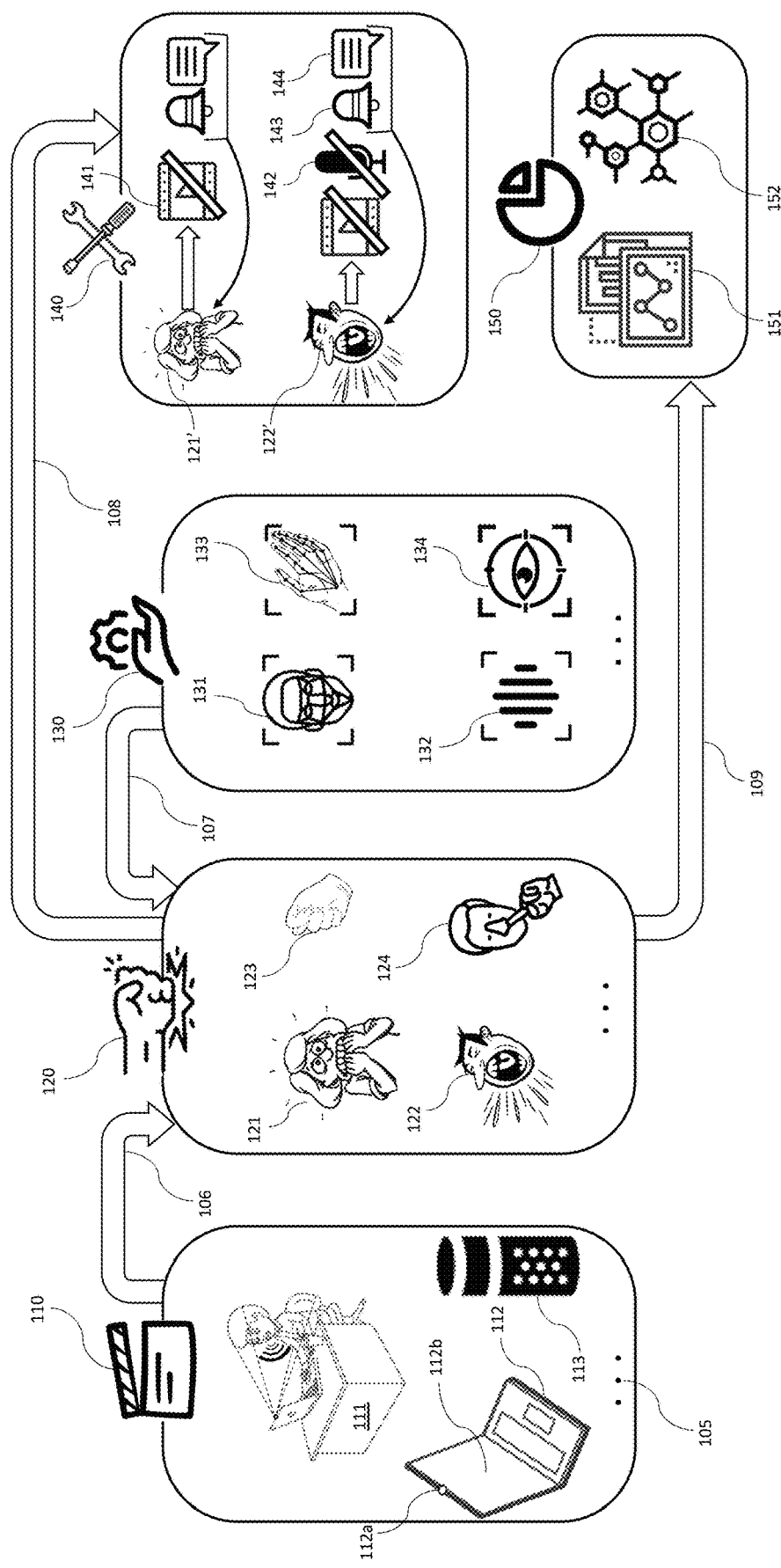
FIGS. 1A-1D are schematic illustrations of the system architecture and components, according to an embodiment of the system described herein.

FIG. 1A shows system architecture and includes five components of the system: a pool of capturing devices 110, a list of bad habits (unacceptable behaviors) 120, a technology stack 130, a mitigation component 140, and an analytics and machine learning component 150. Each component is exemplified with several characteristic items (periods at the bottom of components, like periods 105 of the capturing devices 110, indicate that more items are available in FIGS. 1B-1D):

A basic configuration of the capturing devices 110 for a video conference is represented by an item 111 where a user sitting at a table with a laptop 112 is captured by a front-facing video camera 112a of the laptop 112, watches the video conference on a screen 112b and may speak into a built-in microphone and listen through built-in speakers (not shown in FIG. 1A). The basic configuration may be expanded in a variety of ways, represented in FIG. 1A by a smart speaker 113 and further detailed in FIG. 1B.

Figure 1D:
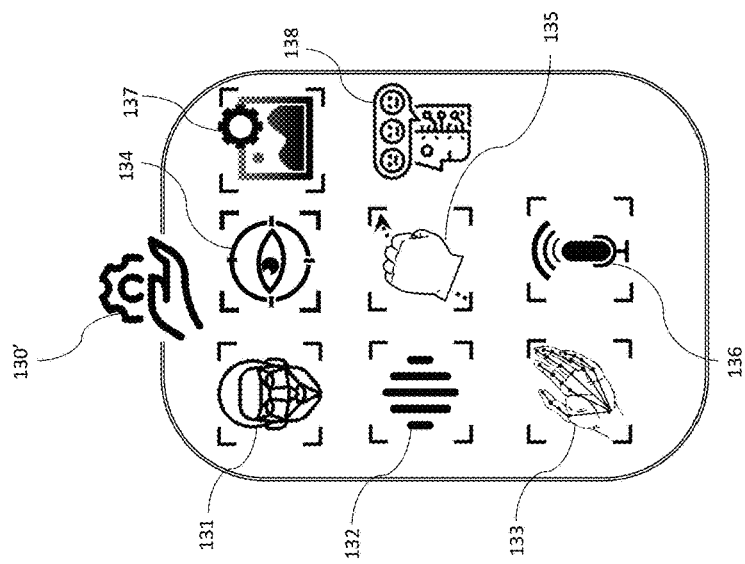
Figure 1C:
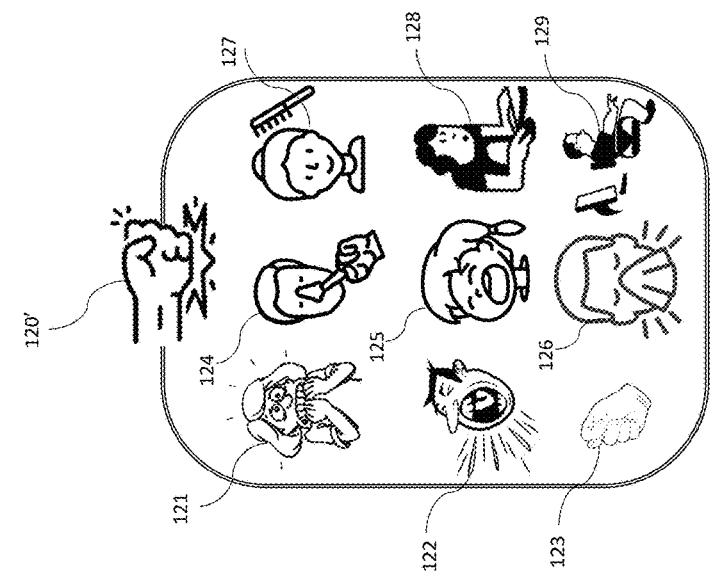

A basic list of the bad habits 120 includes nail biting 121, yelling 122, making unacceptable gestures 123 and digging one's nose 124; further examples of bad habits are shown in FIG. 1C.

The technology stack 130 for recognizing and tracking unacceptable behaviors is exemplified by facial recognition 131, sound recognition 132, gesture recognition 133 and eye-tracking with gaze estimation 134; more technology entities are presented in FIG. 1D.

Displays of unacceptable behaviors from the list 120 are captured by devices from the capturing devices 110, as shown by an arrow 106, recognized and tracked by technologies from the stack 130, as shown by an arrow 107, and are forwarded to the mitigation component 140, as shown by an arrow 108, which takes measures exemplified by handling nail biting 121' and yelling 122', which include disabling user visibility (illustrated by an item 141), audibility (illustrated by an item 142) and sending alarms 143 and notifications 144 to the user, as explained elsewhere herein (see three mitigation scenarios in the Summary section).

Data on recognition of episodes of unacceptable behavior, potentially including raw recorded video, audio, sensor and other data, user feedback and system actions may be transferred to the analytics and machine learning component 150, as shown by an arrow 109. Subsequent data processing, using portions of raw data as training materials and incremental post-meeting machine learning, are explained elsewhere herein.

Figure 1B:
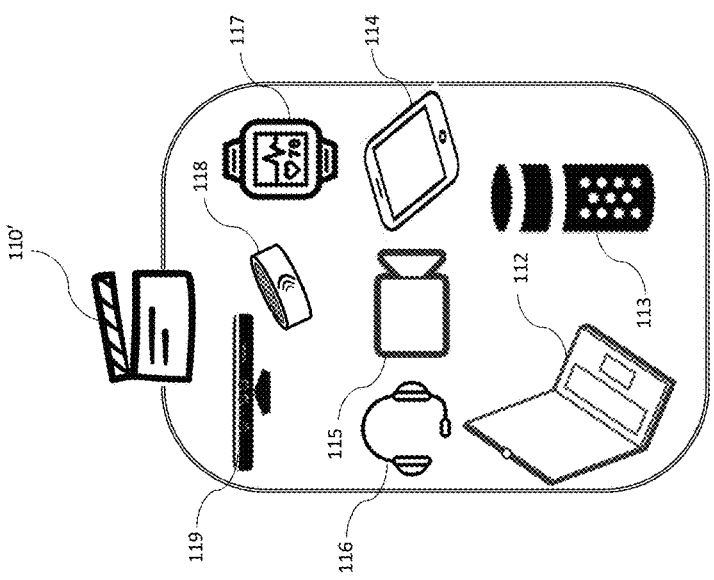

FIG. 1B shows an extended version 110' of the capturing devices 110. In addition to the previous listing of the laptop 112 and the smart speaker 113, the extended version 110' may include mobile devices 114 (smartphones, tablets, etc.), autonomous and add-on cameras 115, headsets and regular speakers 116, smart watches and wristbands 117, smart rings 118 and wearable (as well as standalone) sensors 119. The extended version 110' may also include other types of wearable devices, such as smart eyewear, heads-up displays, headbands, smart footwear, etc.

FIG. 1C shows an extended version 120' of the list of unacceptable behaviors 120, adding to the bad habits 121-124 that were previously listed the following five habits: yawning 125, blowing one's nose 126, combing user's hair in public 127, slouching 128 and looking away from the screen (where a video conference is running) 129. Obviously, there are many more examples of unacceptable behaviors outside the extended version 120'.

FIG. 1D provides an extended version 130' to extend the technology stack 130 beyond the four technologies 131-134 exemplifier in FIG. 1A to add hand movement recognition 135, speech recognition 136 (different from the sound recognition 132), general image recognition 137 (see examples of applications of this technology to additional tasks in the Summary section), and sentiment recognition 138.

Figure 2B:
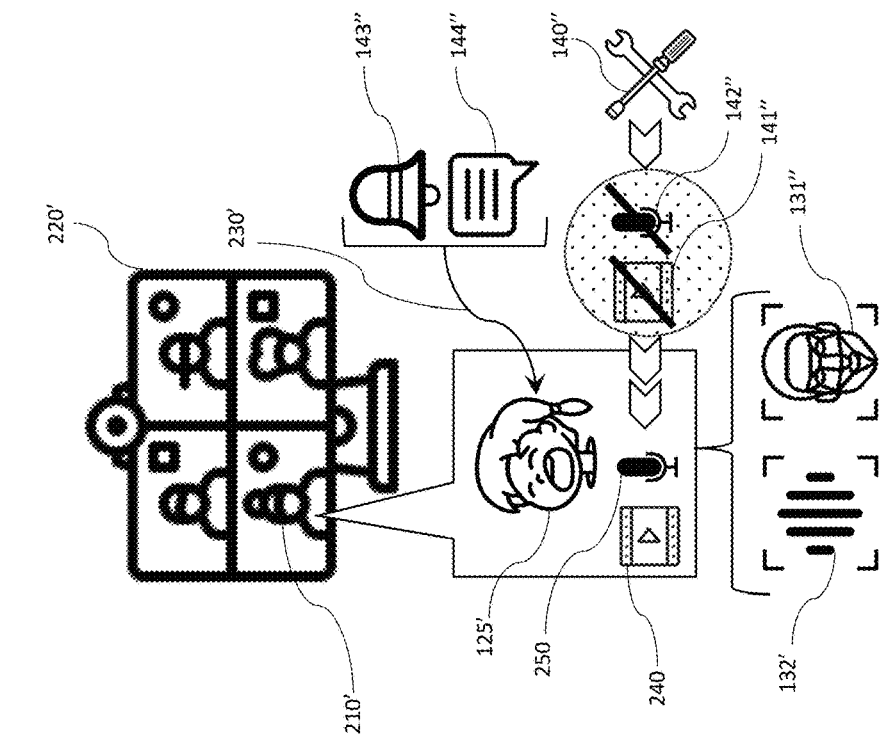
FIGS. 2A-2B are schematic illustrations of detecting and mitigating episodes of bad behavior during a video meeting, according to an embodiment of the system described herein.
Figure 2A:
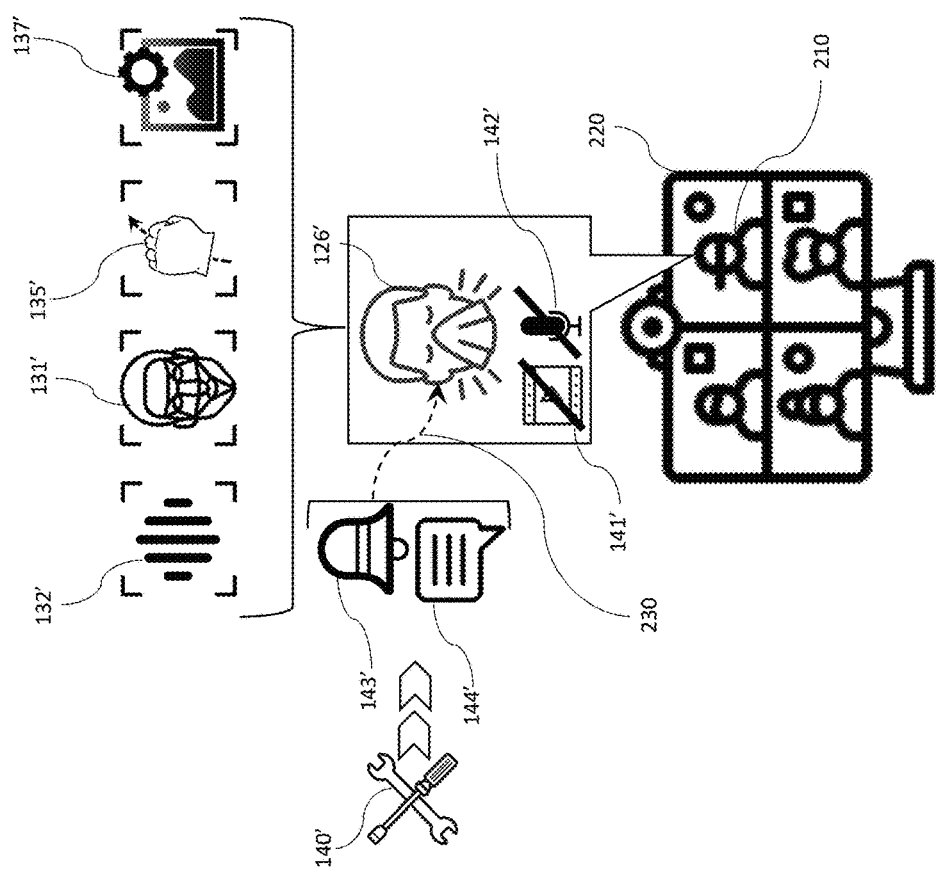

FIGS. 2A-2B are schematic illustrations of detecting and mitigating episodes of bad behavior during a video meeting.

In FIG. 2A, a user 210 participates in a video conference 220. During the conference, four technologies from a technology stack: sound recognition 132', facial recognition 131', hand movement recognition 135' and general image recognition 137' are jointly detected in connection with an episode 126' of the user 210 loudly blowing his nose. Specifically, the sound recognition 132' may detect a sound specific for blowing one's nose; the facial recognition 131' may recognize a characteristic facial expression for an act of blowing one's nose (which may differ from person to person and may require an adaptation of the facial recognition technology to specific facial expression patterns of the user 210, as explained elsewhere herein in conjunction with mitigation scenarios); hand movement recognition 135' and general image recognition 137' may detect bringing bring a handkerchief to the user's nose.

The recognized episode of unacceptable behavior may be transferred to a mitigation component 140', similar to the mitigation component 140 shown in FIG. 1A and explained in the accompanying text. Upon checking user status, the system may realize that a video capture 141' and an audio capture 142' of the user are temporarily or permanently disabled and there was no disturbance for the meeting conduct or other participants. Accordingly, the system may record the episode (and potentially record raw data provided by the technology stack) for subsequent manipulations in the analytics and machine learning component (not shown in FIG. 2A) and may generate a user warning 143' and a notification 144', optionally sending the user warning 143' and the notification 144' to the user as shown by a dashed arrow 230. One reason to send the user warning 143' and the notification 144' to the user (in spite of the fact that the user behavior caused no harm to the video meeting) is verifying that the technology stack has correctly detected the episode and receiving a user confirmation, as explained elsewhere herein.

In FIG. 2B, a user 210' participates in a video conference 220'. During the meeting, two technologies, sound recognition 132' and facial recognition 131', jointly detect a yawning episode 125' (the gesture recognition technology shown in Table 1 in conjunction with yawning detection was not used in this example, because the user did not cover her mouth with her hand). Analogously to FIG. 2A, the episode 125' is stored in the analytics and machine learning component (not shown in FIG. 2B) and is referred to the mitigation component 240". Upon checking the status of user 210', the mitigation subsystem may discover that both visibility 240 and audibility 250 of the user are active, so other meeting participants might have seen and even more likely might have heard the yawning display and sound. In response, the system may generate a warning 143" and a notification 144" and unconditionally send the warning 143" and the notification 144" to the user 210' (as shown by a solid arrow 230'). Moreover, if the mitigation has reached an advanced stage, as explained elsewhere herein, the system may determine that behavior of the user 210' is too disturbing for the video conference (for example, in case when yawning is detected with high recognition accuracy, occurs repetitively and causes reaction by other conference participants or interferes with a presentation or an important discussion) and the mitigation component may proactively cut off user visibility and/or audibility, as shown by two items 141", 142".

FIGS. 3A-3D are schematic illustrations of various face touch outcomes captured by the front-facing camera 112a of the notebook 112 (see also FIG. 1A).

Figure 3B:
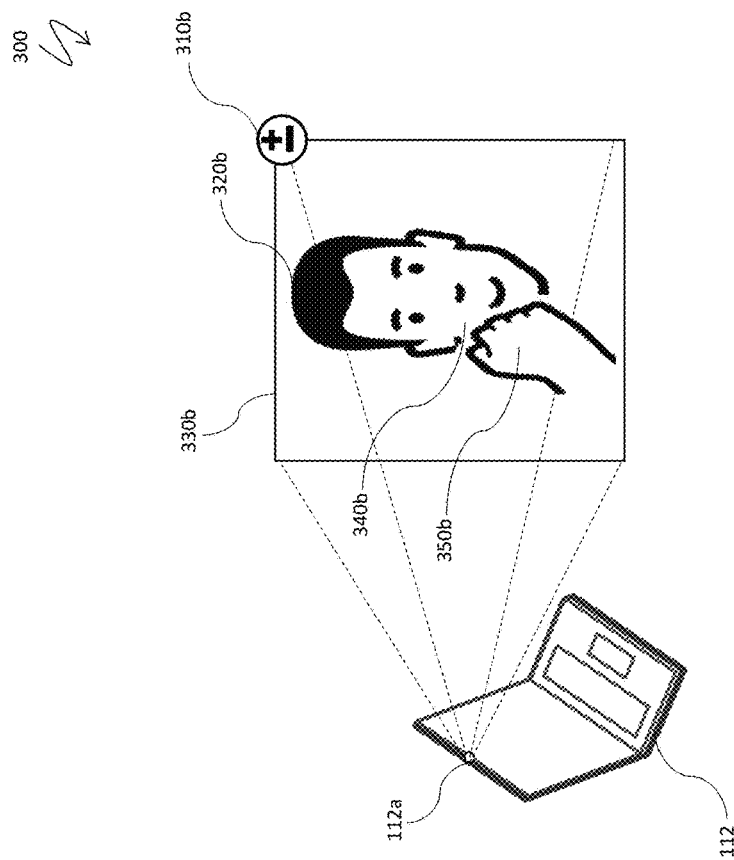
FIGS. 3A-3D are schematic illustrations of various face touch outcomes captured by a front-facing camera of a notebook, according to an embodiment of the system described herein.
Figure 3A:
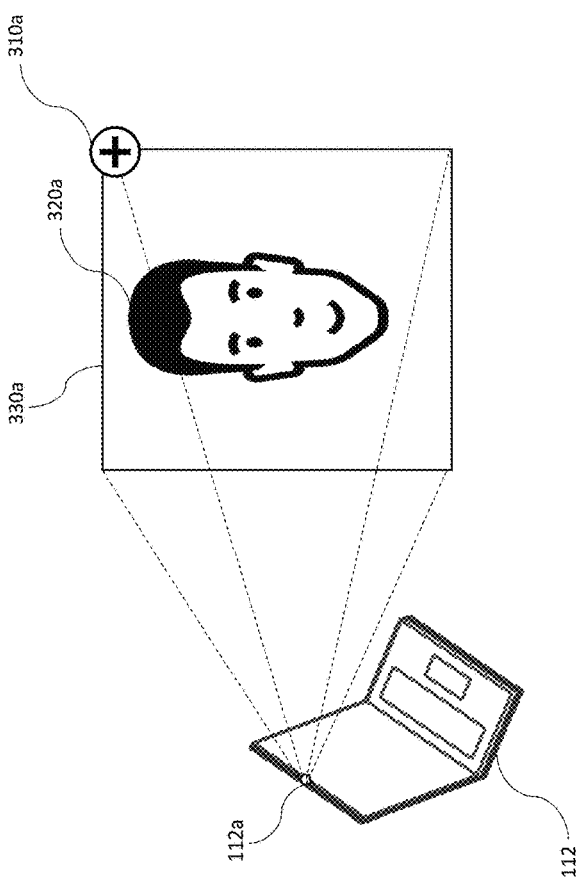

In FIG. 3A, an outcome 310a is favorable: hand(s) of a user 320a is (are) not detected in a video frame 330a.

In FIG. 3B, an outcome 310b is, generally speaking, unfavorable: a frame 330b shows a user 320b touching his cheek 340b with a first 350b. However, the touch illustrated in FIG. 3B causes less issue with transmitting germs or viruses, so the outcome 310b is marked as a moderate outcome.

Figure 3D:
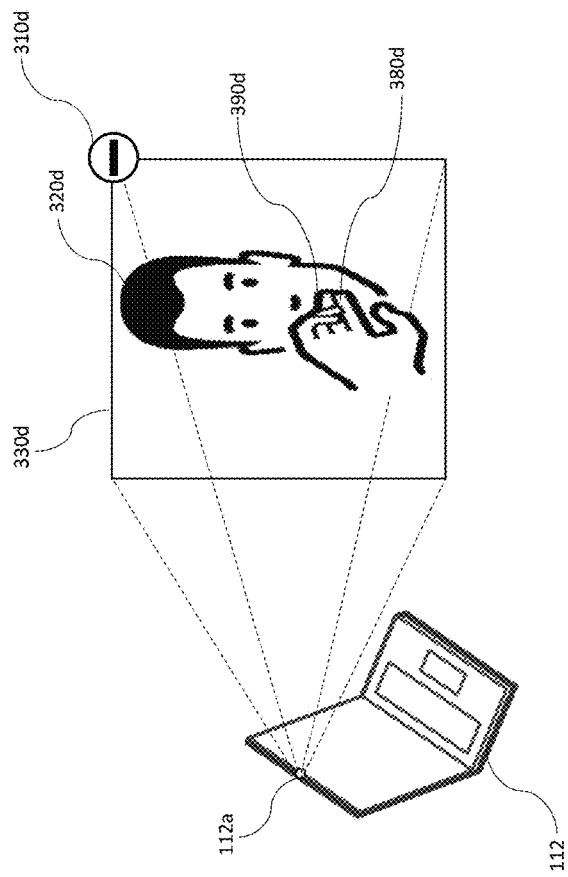
Figure 3C:
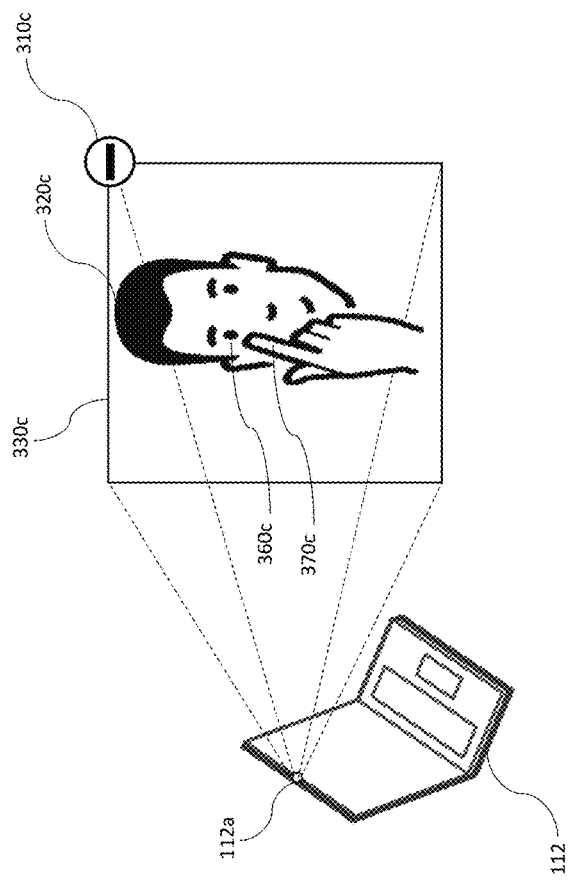

Both outcomes 310c, 310d in FIGS. 3C, 3D look highly unfavorable and are marked as such: in FIG. 3C, a video frame 330c shows a user 320c touching an eye 360c with a finger 370c, while in FIG. 3D a video frame 330d displays a user 320d putting fingers 380d into a mouth 390d of the user 320d.

FIGS. 4A-4D are schematic illustrations of dynamic facial and hand movement recognition, of trajectory and risk assessment, and of user alarm options.

FIG. 4A shows a general layout and usage of facial recognition. The camera 112a of the notebook 112 captures a series of video frames 330a; for each frame, the facial recognition technology 131 identifies a face 320a and identifies positions of several hotspots, or touch risk zones 420 on the face 320a, typically corresponding to mouth, nose, eyes and ears.

FIG. 4B illustrates functioning of dynamic facial and hand movement recognition in a secure situation with no alarms. Usage of the facial recognition technology 131 is explained in conjunction with the FIG. 4A. Features of the hand movement recognition technology 135 (see FIG. 1 for item enumeration) may include recognizing a dynamically changing shape of a moving hand (fist, palm, fingers), a predominant direction and speed of the moving hand, estimating a trajectory of the moving hand, etc. The system may reserve an alert zone (also called a capture zone) 440 within a video frame 430; the alert zone 440 is proximal to a facial image 320a' of a user. When an image of a hand of the user is detected in the capture zone, the hand movement recognition technology 135 estimates a current direction 450a of the hand and estimates a state and palm orientation 460a of the hand. Note that FIG. 4B illustrates a moving first of the user. The hand movement recognition technology 135 also estimates a trajectory of the central axis 470a of the moving hand, which in FIG. 4B does not cross an alert zone and accordingly does not cause an alarm, so a current user status 480a is considered safe.

Figure 4C:
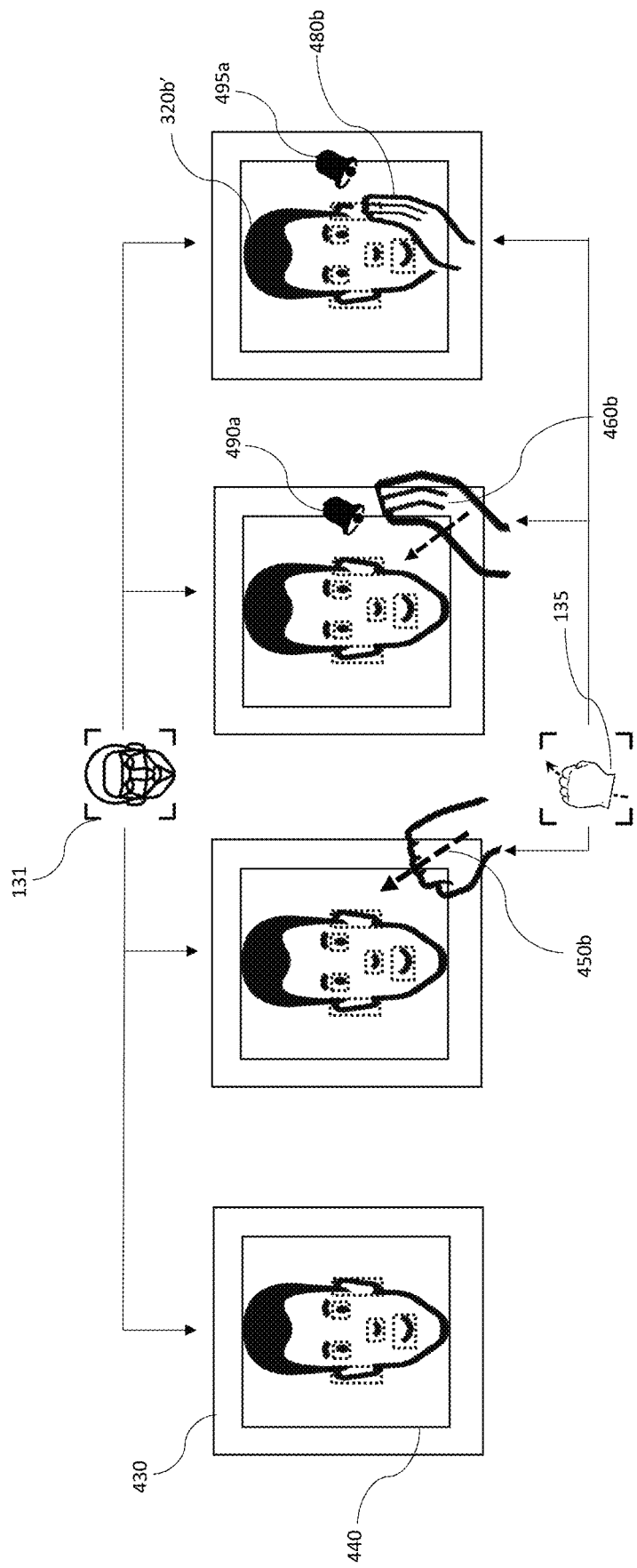

FIG. 4C illustrates a functioning of dynamic facial and hand movement recognition in a situation with a minor face touching alarm. The capture zone 440 plays the same roles as in FIG. 4B; facial and the hand movement recognition technologies 131, 135 also function similarly but are applied to a different situation. Once a hand of a user 320b' is detected in the capture zone 440, the hand movement recognition technology 135 estimates a direction 450b of the hand and then estimates a shape and then a palm orientation of the hand. A direction and speed 460b are estimated, which causes a prediction that an open palm is moving toward a face of the user 320b' and will soon cross the alert zone 440 and touch the face. The prediction activates the mitigation system, which sounds or displays a minor alert 490a, reflecting an assessment by the mitigation system that a final position of the palm touching the face of the user is relatively safe from the hygienic standpoint. As the palm touches the face, the alert may be modified to a different tone 495a, staying a minor alert and corresponding to an assigned user status 480b.

Figure 4D:
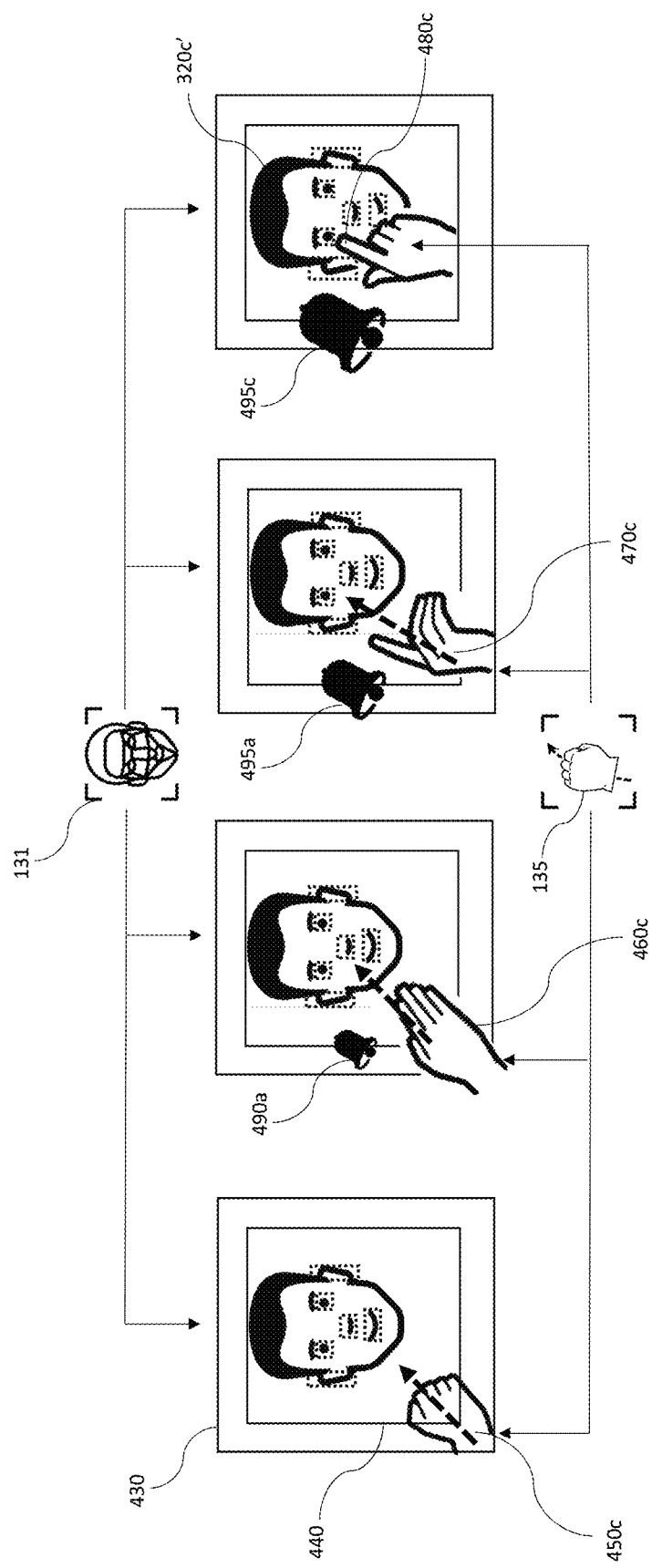

FIG. 4D illustrates functioning of dynamic facial and hand movement recognition in a situation with a major face touching alarm. The roles of the capture zone 440 and of the facial and hand movement recognition technologies 131, 135 are the same as in FIGS. 4B-4C. As previously, once a hand of a user 320c' is captured in a video frame, the hand movement recognition technology 135 assesses a direction 450c of the hand; shortly after, the user moves open fingers in a direction of the face of the user 320c', as shown by a pictogram 460c; the configuration shown in FIG. 4D is considered potentially the most harmful; based on an assessment 460c and an extrapolation of hand trajectory, the mitigation component immediately activates a low-volume alarm 490a. A next assessment 470c provided by the hand movement recognition system 135 confirms and further enhances the previous assessment, because a finger of the user 320c' is well within an alert zone and approaches a hotspot (a touch risk zone provided by the facial recognition technology 131, as explained in conjunction with FIG. 4A) associated with an eye of the user 320c'. In response to the latter assessment, the alarm is elevated and upgraded to a state 495a. Subsequently, the user touches an eye with a finger, a status 480c is determined as dangerous and the alarm is set at a maximum level 495c.

Figure 5:
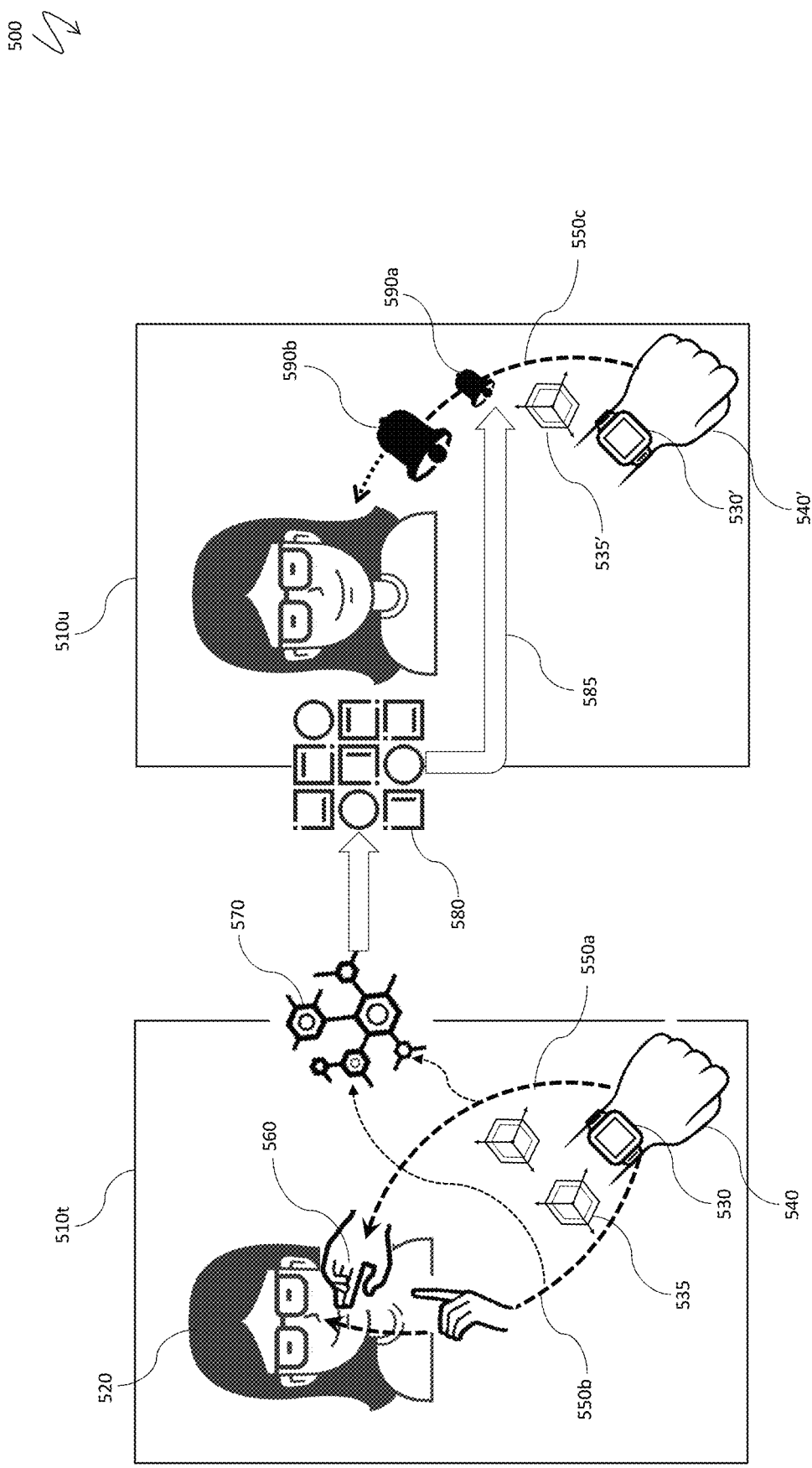
FIG. 5 is a schematic illustration of a face touch identification technology for mobile users with a smart watch, according to an embodiment of the system described herein.

FIG. 5 is a schematic illustration 500 of a face touch identification technology for mobile users with a smart watch. Technology adaptation to a particular user may include a training (machine learning) phase 510t for a user 520, an owner of a smart watch (or a smart wristband) 530 attached to a hand 540 of the user 520. An accelerometer or other movement sensor (or multiple sensors) 535 may capture trajectories and parameters (speed, rotation) of user hand movements 550a, 550b that may occasionally cause undesired events 560 corresponding to the user touching their face. Fragments of such trajectories may be used as a training material for a machine learning component 570, which may eventually produce a reliable classifier 580 for a usage phase 510u whereby fragments of trajectories 550c, obtained through measurements by sensor(s) 535' of movements of an active user hand 540' with an attached smart watch 530', are converted into feature vectors (feature construction is established at the training phase) and sent to the classifier 580 used for predicting whether a particular fragment of the hand trajectory poses an increased risk of the user 520 touching their face with the moving hand and may activate alarms 590a, 590b warning the user 520 about an undesirable situation. An increase in alarm volume/urgency for the alarm 590b may be associated with classification progress when the classifier 580 receives feature vectors constructed for larger fragments of the movement trajectory as the moving hand approaches the face of the user 520.

Figure 6B:
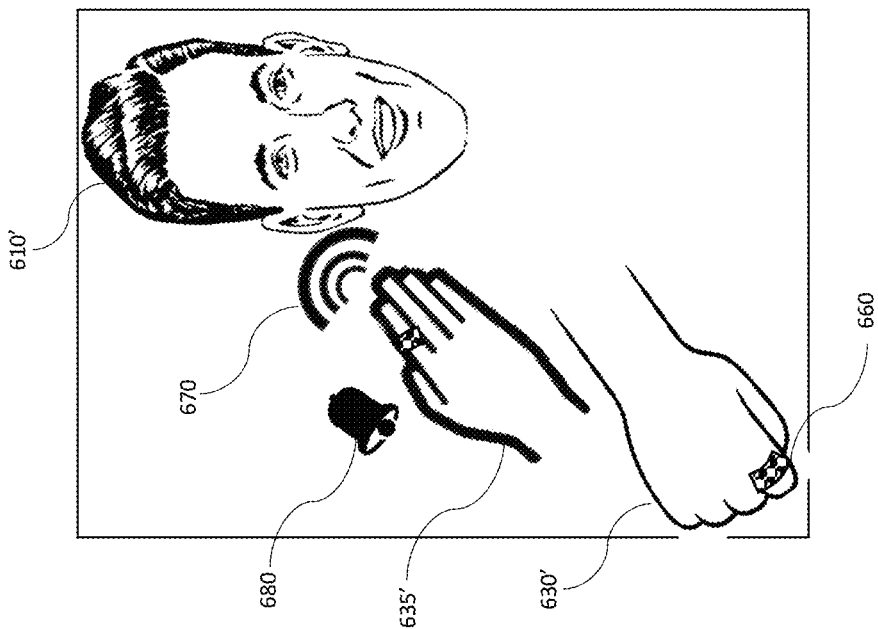
FIGS. 6A-6B are schematic illustrations of face touch alarms for mobile users with smart eyeglasses and a smart ring featuring proximity sensors, according to an embodiment of the system described herein.
Figure 6A:
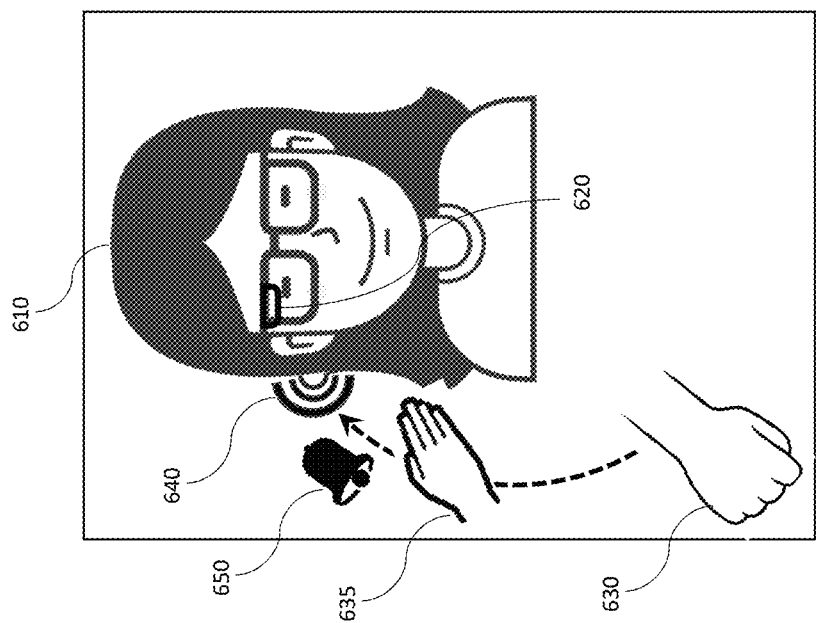

FIGS. 6A-6B are schematic illustrations of face touch alarms for mobile users with smart eyeglasses and a smart ring featuring proximity sensors.

In FIG. 6A, a user 610 with a pair of smart eyeglasses 620 supplied with a proximity sensor automatically activates an alarm 650 every time when a passive hand 630 reaches a position 635 where the hand 630 is detected by the proximity sensor, as shown by an item 640.

In FIG. 6B, a user 610' wears a smart ring 660 on a finger of an active hand 630'; the ring 660 has a built-in proximity sensor. The system automatically enables an alarm 680 every time the active hand 630' reaches a position 635' where the proximity sensor of the ring 660 detects the face of the user 610', as shown by an item 670.

Figure 7:
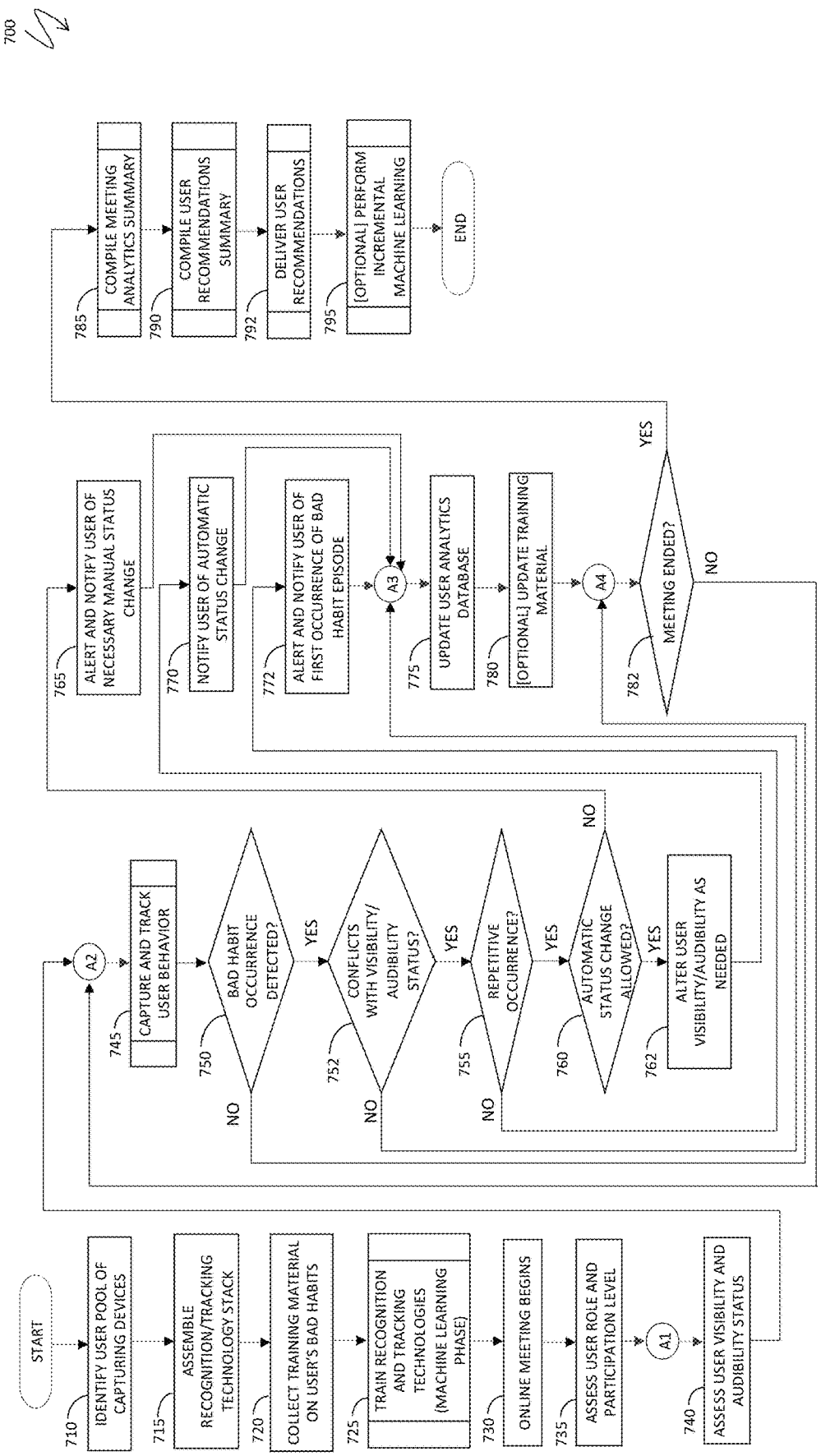
FIG. 7 is a system flow diagram illustrating system functioning in connection with detection and mitigation of unacceptable user behavior episodes during a video meeting, according to an embodiment of the system described herein.

Referring to FIG. 7, a system flow diagram 700 illustrates system functioning in connection with detection and mitigation of unacceptable user behavior episodes during a video meeting. Processing begins at a step 710, where a user pool of capturing devices is identified, as explained elsewhere herein (see, for example, FIGS. 1A, 1B and the accompanying text). After the step 710, processing proceeds to a step 715, where the system assembles recognition and tracking technology stack, corresponding to the pool of capturing devices (see FIGS. 1A, 1D and the accompanying text for details). After the step 715, processing proceeds to a step 720, where the system collects training material on user's bad habits (unacceptable behavior) utilizing captured data under different conditions. After the step 720, processing proceeds to a step 725, an initial machine learning phase, where the system trains recognition and tracking technologies, adapting them to user specifics, as described elsewhere herein.

After the step 725, processing proceeds to a step 730, where an online meeting begins. After the step 730, processing proceeds to a step 735, where the system assesses user role and participation level in the meeting. After the step 735, processing proceeds to a step 740, where the system assesses the status of user visibility and audibility, i.e., whether the audio-video stream capturing the user is available, fully or partially (video or audio only) to other meeting participants. After the step 740, processing proceeds to a step 745, where the system captures and tracks user behavior using the pool of capturing devices, as explained elsewhere herein (see FIGS. 1A-1D, 2A-2B for details). After the step 745, processing proceeds to a test step 750, where it is determined whether a bad habit occurrence has been detected. If so, processing proceeds to a test step 752, where it is determined whether the bad habit display conflicts with the current visibility and/or audibility status of the user. If so, processing proceeds to a test step 755, where it is determined whether the current bad habit occurrence was a repetitive occurrence during the meeting. If so, processing proceeds to a test step 760, where it is determined whether a mitigation component is allowed by the user to automatically change user visibility and audibility status. If so, processing proceeds to a step 762, where the mitigation component alters the user visibility/audibility status as needed to prevent, temporarily or permanently during the meeting, other meeting participants from the current or subsequent displays of user's bad habits, as explained elsewhere herein (see, for example, discussion on mitigation scenarios in the Summary section and FIG. 2B with the accompanying text). After the step 762, processing proceeds to a step 770, where the user is notified about the automatic status change. After the step 770, processing proceeds to a step 775, where the system updates user analytics database with the user capturing and tracking data, episodes of bad behavior and mitigation actions. After the step 775, processing proceeds to a step 780, where the system optionally updates training material (see discussion on mitigation scenarios in the Summary section).

After the step 780, processing proceeds to a test step 782, where it is determined whether the meeting has ended. If so, processing proceeds to a step 785, where the meeting analytics summary is compiled. After the step 785, processing proceeds to a step 790, where a user recommendations summary is compiled. After the step 790, processing proceeds to a step 792, where the user receives the user recommendations summary. After the step 792, processing proceeds to a step 795, where the system optionally performs incremental machine learning (see the step 780, above, and the discussion on mitigation scenarios in the Summary section). After the step 795, processing is complete.

If it is determined at the test step 782 that the meeting has not ended, processing proceeds to the step 745, which may be independently reached from the step 740.

If it is determined at the test step 760 that the mitigation component is not allowed to automatically change user visibility and audibility status, processing proceeds to a step 765, where the system alerts and notifies the user about the necessity to manually change visibility and/or audibility status. After the step 765, processing proceeds to the step 775, which may be independently reached from the step 770.

If it is determined at the test step 755 that the current bad habit occurrence is the first such occurrence during the meeting, processing proceeds to a step 772, where the system alerts and notifies the user of the first occurrence of a bad habit episode. After the step 772, processing proceeds to the step 775, which may be independently reached from the steps 765, 770. If it is determined at the test step 752 that the current bad habit occurrence does not conflict with user's visibility/audibility status (for example, if the audio-video stream capturing the user is temporarily or permanently disabled, as shown in FIG. 2A), processing proceeds to the step 775, which may be independently reached from the steps 765, 770, 772. If it is determined at the test step 750 that the bad habit occurrence has not been detected, processing proceeds to the test step 782, which may be independently reached from the step 780.

Figure 8:
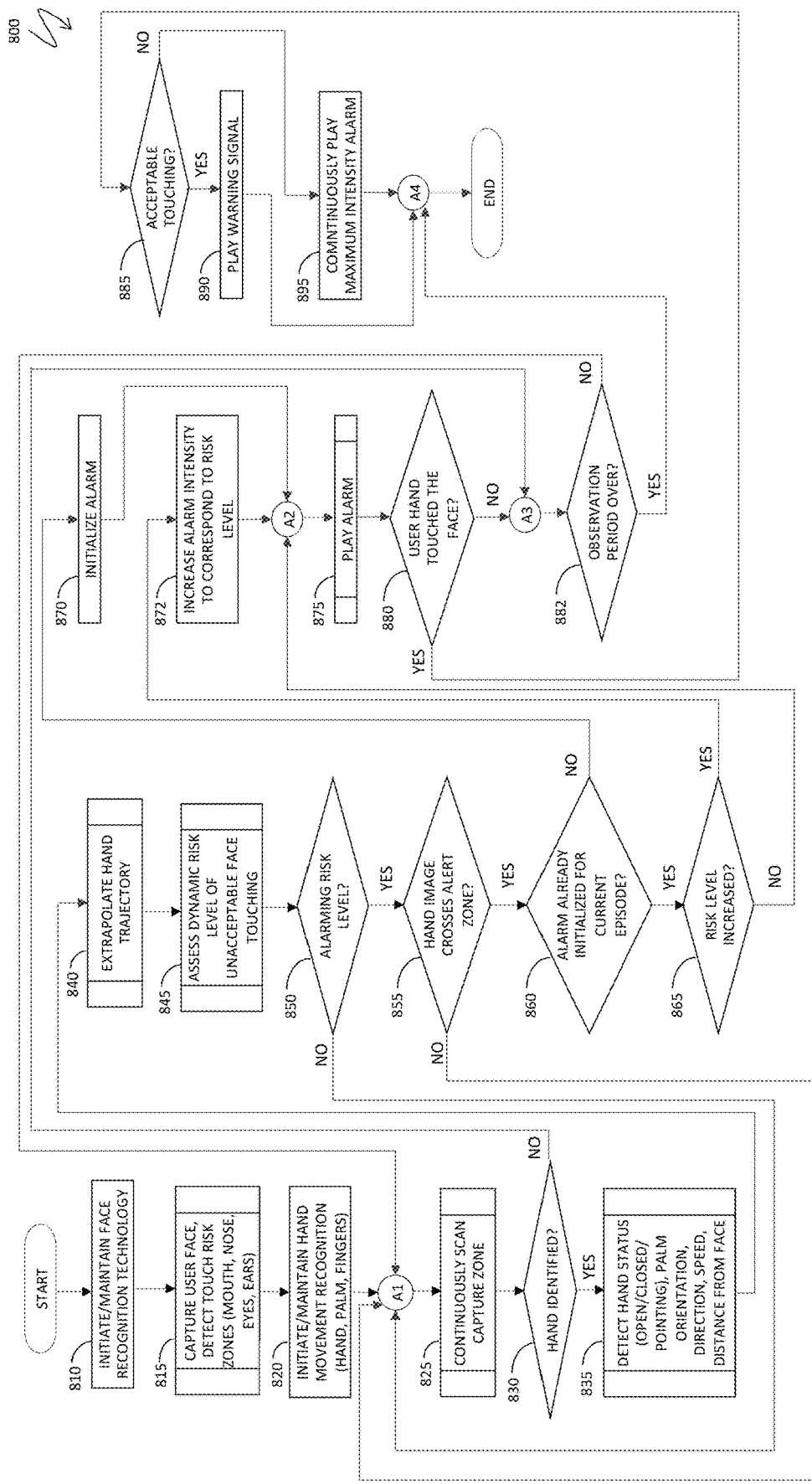
FIG. 8 is a system flow diagram illustrating system functioning in connection with preventing desktop and notebook users from touching their faces, according to an embodiment of the system described herein.

Referring to FIG. 8, a system flow diagram 800 illustrates system functioning in connection with preventing desktop and notebook users from touching their faces. Processing begins at a step 810, where the system initiates or maintains (if previously initiated) the face recognition technology and software, discussed above. After the step 810, processing proceeds to a step 815, where the face recognition software captures a user face from the video stream and dynamically detects touching of risk zones (mouth, nose, eyes, ears). After the step 815, processing proceeds to a step 820, where the system initiates or maintains the hand movement recognition technology and software, including dynamic recognition of the hand state (hand, palm, fingers, fist, etc.). After the step 820, processing proceeds to a step 825, where the system continuously detects, scans and processes capture zones in subsequent video frames (for more information, see FIGS. 4B-4D and the accompanying text). After the step 825, processing proceeds to a test step 830, where it is determined whether a user hand is identified in the current capture zone. If so, processing proceeds to a step 835, where the hand movement recognition software detects the hand status (open, closed, pointing, etc.), palm orientation, direction, speed and distance from the face.

After the step 835, processing proceeds to a step 840, where the hand trajectory is extrapolated by the system based on the previously processed hand movement. After the step 840, processing proceeds to a step 845, where the system assesses the dynamic risk level of unacceptable face touching based on the extrapolated hand trajectory. After the step 845, processing proceeds to a test step 850, where it is determined whether the risk level is alarming. If so, processing proceeds to a test step 855, where it is determined whether the captured image of the user hand has crossed boundaries of an alert zone (see FIGS. 4B-4D for explanations). If so, processing proceeds to a test step 860, where it is determined whether the alarm has already been initialized for the current episode of hand movement. If so, processing proceeds to a test step 865, where it is determined whether the risk level has increased compared with the risk level for the current alarm intensity. If so, processing proceeds to a step 872, where the alarm intensity is increased to correspond to the risk level. After the step 872, processing proceeds to a step 875, where the system plays the alarm. After the step 875, processing proceeds to a test step 880, where it is determined whether a hand of the user has touched the face of the user. If not, processing proceeds to a test step 882, where it is determined whether the observation period is over. If so, processing is complete; otherwise, processing proceeds to the step 825, which may be independently reached from the step 820.

If it is determined at the test step 880 that the user hand has touched the face, processing proceeds to a test step 885, where it is determined whether the touching is acceptable (see FIGS. 4C-4D and the accompanying text for more information). If so, processing proceeds to a step 890, where the system plays a warning signal (instead of initializing an alarm). After the step 890, processing is complete. If it is determined at the test step 885 that the touching is not acceptable, processing proceeds to a step 895, where the system continuously plays the maximum intensity alarm. After the step 895, processing is complete.

If it is determined at the test step 865 that the risk level has not increased compared to the level reflected in the then current alarm intensity, processing proceeds to the step 875, which may be independently reached from the step 872. If it is determined at the test step 860 that the alarm has not been initialized for the current episode, processing proceeds to a step 870, where the alarm is initialized. After the step 870, processing proceeds to the step 875, which may be independently reached from the test step 865 and the step 872. If it is determined at the test step 855 that the hand image does not cross the boundaries of the alert zone, processing proceeds to the step 825, which may be independently reached from the step 820 and the test step 882. If it is determined at the test step 850 that the assessed risk level of unacceptable face touching is not alarming, processing proceeds to the step 825, which may be independently reached from the step 820 and the test steps 855, 882. If it is determined at the test step 830 that user hand has not been identified in the capture zone, processing proceeds to the test step 882, which may be independently reached from the test step 880.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to notebooks, smartphones, tablets and other mobile computers and on wearable devices. Smartphones and tablets may use operating system(s) selected from the group consisting of: iOS, Android OS, Windows Phone OS, Blackberry OS and mobile versions of Linux OS. Notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of handling unacceptable behavior by a participant in a video conference, comprising:
   detecting the unacceptable behavior by the participant by applying machine learning to data about the participant received from one or more capturing devices and by using a predetermined list of bad habits;
   determining recognition accuracy for the unacceptable behavior; and
   providing a response to the unacceptable behavior that varies according to the recognition accuracy, wherein the recognition accuracy is estimated to be lower at an early stage of the system than at later stages of the system and wherein the response to the unacceptable behavior is an alert to the user for each detected episode in response to the recognition accuracy being estimated to be lower and wherein the participant is asked to provide confirmation for each detected episode.

2. A method, according to claim 1, wherein the machine learning includes an initial training phase that, prior to deployment, is used to obtain a general recognition capability for each item on the predetermined list of bad habits.

3. A method, according to claim 1, wherein the one or more capturing devices include a laptop with a camera and a microphone, a mobile device, autonomous cameras, add-on cameras, headsets, regular speakers, smart watches, wristbands, smart rings, and wearable sensors, smart eyewear, heads-up displays, headbands, and smart footwear.

4. A method, according to claim 1, wherein the data about the participant includes at least one of: visual data, sound data, motion, proximity and chemical sensor data, heart rate, breathing rate, and blood pressure.

5. A method, according to claim 1, wherein the list of bad habits includes nail biting, yelling, making unacceptable gestures, digging one's nose, yawning, blowing one's nose, combing one's hair, slouching, and looking away from a screen being used for the video conference.

6. A method, according to claim 5, wherein technologies used to detect bad habits include facial recognition, sound recognition, gesture recognition, and hand movement recognition.

7. A method, according to claim 6, wherein yawning is detected using a combination of the facial recognition technology, the sound recognition technology, and the gesture recognition technology.

8. A method, according to claim 6, wherein face touching is detected using the facial recognition technology and hand movement recognition technology.

9. A method, according to claim 6, wherein digging one's nose is detected using the facial recognition technology and hand movement recognition technology.

10. A method, according to claim 1, wherein the confirmation provided by the participant is used to improve the recognition accuracy of the machine learning.

11. A method, according to claim 1, wherein the confirmation provided by the participant is used to improve recognition speed of the machine learning.

12. A method, according to claim 1, wherein the confirmation provided by the participant is used to provide early recognition of displays of the bad habits detected by the machine learning.

13. A method, according to claim 12, wherein the early recognition is used to predict when a participant will exhibit unacceptable behavior.

14. A method, according to claim 13, wherein the response is provided when the participant is predicted to exhibit unacceptable behavior.

15. A method, according to claim 13, wherein the response includes at least one of: cutting off audio input of the user or cutting off video input of the user.

16. A method, according to claim 12, wherein the early recognition is based on at least one of: observed behavioral norms of the participant and planned activities of the participant.

17. A method, according to claim 1, wherein the participant is provided with only a warning if the participant is not providing audio input and/or video input to the video conference.

18. A method of preventing a user from touching a face of the user, comprising:
   obtaining video frames of the user including the face of the user;
   applying facial recognition technology to the video frames to detect locations of particular portions of the face;
   detecting a position, shape, and trajectory of a moving hand of the user in the video frames;
   predicting a final position and shape of the hand based on the position, shape, and trajectory of the hand and on the locations of the specific portions of the face; and
   providing an alarm to the user in response to predicting a final position of the hand will be touching the face of the user, wherein the alarm varies according to a predicted final shape of the hand and according to predicting that a final position of the hand will be touching a specific one of the particular portions of the face and wherein the predicted final shape of the hand is one of: an open palm and open fingers and wherein a sound for the alarm provided in response to the predicted final shape being an open palm is less severe than a sound for the alarm provided in response to the predicted final shape being open fingers and the predicted final position being one of: a mouth, nose, eyes, and ears of the user.

19. A method, according to claim 18, wherein the user is a participant in a video conference.

20. A method, according to claim 18, wherein predicting a final position of the hand includes determining if the hand crosses an alert zone that is proximal to the face.

21. A method of preventing a user from touching a face of the user, comprising:
   obtaining video frames of the user including the face of the user;
   applying facial recognition technology to the video frames to detect locations of particular portions of the face;
   detecting a position, shape, and trajectory of a moving hand of the user in the video frames;
   predicting a final position and shape of the hand based on the position, shape, and trajectory of the hand and on the locations of the specific portions of the face; and
   providing an alarm to the user in response to predicting a final position of the hand will be touching the face of the user, wherein the alarm varies according to a predicted final shape of the hand and according to predicting that a final position of the hand will be touching a specific one of the particular portions of the face and wherein the predicted final shape of the hand is one of: an open palm and open fingers and wherein a sound for the alarm becomes more severe as the predicted final position and the predicted final shape changes to the predicted final shape being open fingers and the predicted final position being one of: a mouth, nose, eyes, and ears of the user.

22. A method, according to claim 21, wherein the user is a participant in a video conference.

23. A method, according to claim 21, wherein predicting a final position of the hand includes determining if the hand crosses an alert zone that is proximal to the face.

* * * * *